United States Patent [19]

Jüngst et al.

[11] Patent Number: 5,625,754

[45] Date of Patent: Apr. 29, 1997

[54] METHOD OF EVALUATING A SET OF LINGUISTIC RULES

[75] Inventors: Ernst-Werner Jüngst; Klaus-Dieter Meyer-Gramann, both of Berlin, Germany

[73] Assignee: Daimler-Benz AG, Stuttgart, Germany

[21] Appl. No.: 493,526

[22] Filed: Jun. 22, 1995

Related U.S. Application Data

[63] Continuation of Ser. No. 151,388, Nov. 12, 1993, abandoned.

[30] Foreign Application Priority Data

Nov. 12, 1992 [DE] Germany ............... 42 38 772.8

[51] Int. Cl.$^6$ .................................................. G06F 17/00
[52] U.S. Cl. ................... 395/51; 395/3; 395/76
[58] Field of Search ................... 395/3, 51, 11, 395/76, 900

[56] References Cited

U.S. PATENT DOCUMENTS

| 5,113,366 | 5/1992 | Yamakawa | 395/900 |
| 5,179,625 | 1/1993 | Hisano | 395/900 |
| 5,189,728 | 2/1993 | Yamakawa et al. | 395/76 |

FOREIGN PATENT DOCUMENTS

0509796A2  10/1992  European Pat. Off. ......... G06G 7/14

OTHER PUBLICATIONS

H. Ishibuchi, et al., *Empirical Study on Learning in Fuzzy Systems*, Proceedings of the Second IEEE International Conference on Fuzzy Systems, Mar. 28–Apr. 1, 1993, San Francisco, CA, vol. 1, 1993 IEEE New York, USA, pp. 607–611.

C.C. Lee, "Fuzzy Logic in Control Systems: Fuzzy Logic Controller–Part I", IEEE Transactions on Systems, Man and Cybernetics, vol. 20, No. 2, pp. 404–435 (1990).

M. Mizumoto, "Realization of PID Controls by Fuzzy Control Methods", Proceedings of the IEEE International Conference on Fuzzy Systems, 1992, pp. 709–715.

H.P. Preuss, "Fuzzy Control—heuristische Regelung mittles unscharfer Logik", Automatisierungstechnische Praxis, vol. 34, 1992, No. 4, pp. 176–184 (Part I) and No. 5, pp. 239–246 (Part II).

C.L. McCullough, "An anticipatory fuzzy logic controller utilizing neural net prediction", Simulation No. 58, May 1992, pp. 327–332.

Generating Fuzzy Rules by Learning From Examples Wang et al. IEEE 13–15 Aug. 1991. pp. 263–268.

Generating Fuzzy Rules by Learning from Examples Wang et al., IEEE 13–15 Jun. 1991.

*Primary Examiner*—Allen R. MacDonald
*Assistant Examiner*—Richemond Dorvil
*Attorney, Agent, or Firm*—Spencer & Frank

[57] ABSTRACT

A method for generating an output for a fuzzy controller by evaluating a set of linguistic rules. For each input signal, a linguistic hedge is formed to be a fuzzy information system. Each linguistic rule is also formed with a premise consisting of a multitude of linguistic statements about pairwise different input signals, linked by AND, or consisting of one statement about one input signal, and a conclusion consisting of a linguistic statement about the output signal of the fuzzy controller. The set of rules is built such that it forms a complete and consistent set of linguistic rules.

12 Claims, 5 Drawing Sheets

FOR EACH INPUT VARIABLE m AND EACH LINGUISTIC STATEMENT $S_{mn}$, n=1....$N_m$, OF THE LINGUISTIC HEDGE OF VARIABLE m DETERMINE THE MEMBERSHIP VALUE $\mu_{mn}$ FROM THE MEMBERSHIP FUNCTIONS ASSOCIATED WITH THE LINGUISTIC STATEMENTS AND THE CURRENT VALUES OF THE INPUT VARIABLES AND STORE INTERMEDIATELY

501

CALCULATE $\omega_i$ ACCORDING TO $$\omega_i(t) = \prod_{j=1}^{N_i} a_{ij}(t)$$

WITH $a_{ij}$ DETERMINED BY TAKING THE INDICES $m_{ij}$ AND $n_{ij}$ FROM THE STATEMENT $A_{ij}$ IN RULE $R_i$ AND SETTING $a_{ij} = \mu_{m_{ij} n_{ij}}$

CALCULATE $Z_t$ ACCORDING TO $$Z_t = \sum_{i=1}^{N} (\omega_i(t) * Z_i)$$

502

METHOD OF EVALUATING A SET OF LINGUISTIC RULES

This application is a Continuation of application Ser. No. 08/151,388, filed Nov. 12, 1993 (now abandoned).

BACKGROUND OF THE INVENTION

1. Field of the Invention

The present invention relates to a method for controlling fuzzy controllers. More particularly, the present invention relates to a method for controlling an operation of a fuzzy controller for evaluating a set of linguistic rules to efficiently produce an output signal related to input signals of the controller.

2. Description of the Related Art

In recent years, fuzzy controllers have gained increasing significance. See, for example, the article by C. L. McCullough, entitled "An Anticipatory Fuzzy Logic Controller Utilizing Neutral Net Prediction" in the periodical "Simulation" No. 58, May 1992, pages 327–332, and the article by H. P. Preuss entitled "Fuzzy control-heuristische Ragelung mittels unscharfer Logic" (Fuzzy Control-Heuristic Control By Means of Fuzzy Logic), Automatisierungstechnische Praxis (Practical Automatization) 34, 1992, No. 4, pages 176–184 (Part 1) and No. 5, pages 239–246 (Part II).

Conventional fuzzy controllers generally are capable of receiving n input signals corresponding to n input values and providing an output signal corresponding to an output value Z. The actions of fuzzy controllers are controlled by a set of linguistic rules $(R_1, \ldots, R_N)$, where each rule has as its premise either a linguistic statement about an input value or an AND linkage of several linguistic statements about input values that differ in pairs. The conclusion of a rule is a linguistic statement about the output values of the controller. Each linguistic statement is described by a fuzzy set characterized by a corresponding membership function.

Most conventional fuzzy controllers described in the literature operate according to the following principle:

The current values of all input values are determined and made available to the fuzzy controller as signals using well-known techniques.

The N rules of a set of rules are applied in parallel on the current values of the n input signals. The application of each rule furnishes a fuzzy set that is characterized by a membership function. The N fuzzy sets are then combined into a single set.

The determination of the $i^{th}$ fuzzy set is based on the membership function which characterizes the conclusion of the $i^{th}$ rule $R_i$ and the current validity of the premise of $R_i$. This current validity is calculated from the degree of membership of the current input values (to which the premise refers) to the membership functions characterizing the linguistic statements of the premise. If the premise is composed a single linguistic statement, its current validity is equal to the corresponding membership value. If the premise is composed of a plurality of linguistic statements, its current value is determined by applying a T-norm, or triangular norm, on the respective membership values. The T-norm most frequently mentioned in the literature is the minimum. T-norms are described, for example in an article C. C. Lee, entitled "Fuzzy Logic in Control Sytems: Fuzzy Logic Controller", published in the IEEE Transactions on Systems, Man, and Cybernetics, 20, 1990, pages 404–435.

In order to combine N fuzzy sets into a single set, a T-conorm is employed for the N characteristic association functions. The customary T-conorm is a point-by-point maximum formation. See C. C. Lee above.

A real number $z_t$ is formed by defuzzification of the fuzzy set determined in the preceding step and is employed as the current value of the output value Z to form an output signal. A conventional defuzzification method involves a determination of the x value of the center of gravity.

In many applications, the association functions characterizing linguistic statements about the characteristics of a controller are trapezoidal. See, for example, the article by Preuss mentioned above.

A drawback of a conventional fuzzy controller is that in each operation cycle many calculation operations on membership functions are required. This is a disadvantage particularly with the requirement for high speed in real time operations, for example. To avoid a need for high performance hardware in such a case, several fuzzy controllers have been introduced which operate in a first phase to defuzzify the membership functions for the conclusion of each respective rule, and in a second phase, operate to determine from each rule a weighted recommendation to give the output signal the predetermined defuzzified value of the membership function of the linguistic statement of its conclusion, which are then combined to produce an output signal. Mentioned as an example, in addition to the above cited literature, is the contribution by M. Mizumoto, entitled "Realization of PID Controls By Fuzzy Control Methods" in Proceedings of the IEEE Intern. Conf. on Fuzzy Systems, 1992, pages 709–715.

Figure 1:
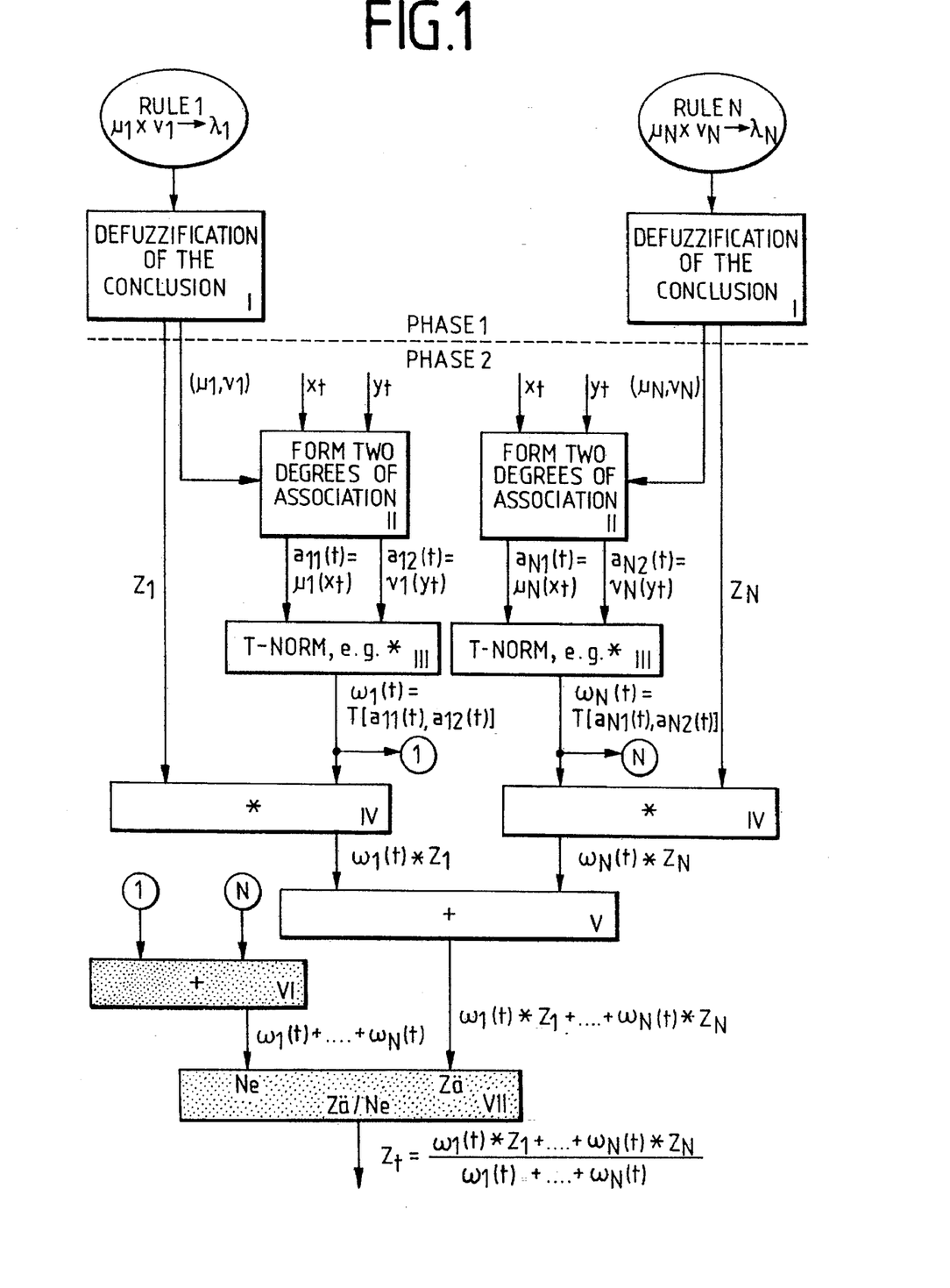
FIG. 1 depicts a conventional fuzzy controller operating mode for evaluating input signals based on a set of linguistic rules to provide an output signal.

FIG. 1 of the drawings shows a mode of operation of a conventional fuzzy controller for the case of two input values X and Y. Let it be assumed that $\mu_i$ and $v_i$ are the membership functions for the linguistic statement about X and Y, respectively, in the premise of rule $R_i$, and $\lambda_i$ is the membership function for the linguistic statement in the conclusion of $R_i$. If only one linguistic statement about x occurs in the premise $R_i$ but none about Y, $v_i(y)=1$ is formally set for all y. If only a statement appears about Y, $\mu_i(x)=1$ is set for all x. Let it be assumed that $x_t$ and $y_t$ are signals representing the current values of input values X and Y. The conventional controller operates as follows:

In a first phase, the membership function $\lambda_i$ for $i=1, \ldots, N$ is defuzzified and thus a signal representing a real number $Z_i$ is obtained for recommended action in rule $R_i$ (Step I).

In a second phase, for every sampling time t, the degree of membership of $x_t$ to $\mu_i$ and the degree of membership of $y_t$ to $v_i$ where $i=1, \ldots, N$, is determined and thus the values $a_{i1}(t)$ and $a_{i2}(t)$ are obtained (Step II). Then, for $i=1, \ldots, N$, the values $a_{i1}(t)$ and $a_{i2}(t)$ are combined into the current weighting factor $\omega_i(t)$ of rule $R_i$, with the customary product or another T-norm being employed (Step III).

For $i=1, \ldots, N$, weighting factor $\omega_i(t)$ is multiplied by the precise conclusion $Z_i$ of rule $R_i$ (Step IV). Then the thus weighted N recommended actions are added (Step V). For normalization, the sum of all weighting factors is formed (Step VI). A signal representing the current value $z_t$ of the value produced by the fuzzy controller, is determined by dividing the value formed in Step V by the value determined in Step VI (Step VII).

One advantage of this conventional manner of proceeding compared to the classical fuzzy control is that the work of the first phase need not take place during the running time of the controller but can be performed in advance when the controller is manufactured or programmed. For example, the defuzzification values of the membership functions for the conclusions of the rules can be stored in a memory, such as a ROM, and accessed by the controller at an appropriate time. Consequently, during runtime of the fuzzy controller, only operations of the second phase need be performed. Except for Step II, this exclusively involves calculation operations with real numbers, not with membership functions.

The drawbacks of the procedure shown in FIG. 1 are:

Since the sum of the weighting factors $\omega_1(t), \ldots, \omega_N(t)$ is generally not equal to 1, it is necessary to perform a summation (Step VI) and a division (Step VII) during the controller runtime for normalizing the weighting factors.

For the case that the sum of the weighting factors and thus the denominator of the equation shown in Step VII of FIG. 1 equals zero, a special treatment must be provided to prevent a division by zero.

The procedure does not define important parameters of the controller concept, for example the T-norm or the configuration of the association functions of the extent of the control set.

SUMMARY OF THE INVENTION

It is an object of the present invention to overcome the above-mentioned disadvantages by implementing a method for controlling fuzzy controllers for evaluating a set of linguistic rules to more economically and efficiently produce an output signal related to input signals applied to the controller.

To provide this and other objects, the present invention provides a method of setting up membership functions for linguistic statements about the input variables of a fuzzy controller and for setting up and evaluating a set of linguistic rules $(R_1, \ldots, R_N)$, each rule including as a premise one or a plurality of linguistic statements about input variables and as the conclusion a linguistic statement about the output variable determined by the rules, each linguistic statement associated with a membership function defined over the value spectrum of the variable referred to in the statement, and wherein in a first phase, for each one of the rules $R_i$ the conclusion is replaced by a numerical value $Z_i$ for the output variable affected by the linguistic statement, with the numerical value $Z_i$ being obtained by defuzzification of the membership function associated with the linguistic statement of the conclusion; and in a second phase, for every point in time t for which an evaluation is to be made, for all rules $R_i$ and for every linguistic statement $A_{ij}$ occurring in the premise of $R_i$ the degree of membership $a_{ij}(t)$ of the current value of the input signal referred to by the linguistic statement $A_{ij}$ is determined from the membership function associated with $A_{ij}$, and the number $z_t$ determined according to the following equation:

$$Z_t = \frac{\sum_{i=1}^{N} (\omega_i(t) * Z_i)}{\sum_{i=1}^{N} \omega_i(t)} \quad (1)$$

where $\omega_i(t)$ is the actual weighting of rule $R_i$ for $i=1, \ldots, N$, and the result of the equation is used as the value determined by the linguistic rules, characterized in that the actual weighting of the rule $R_i$ is formed according to the following equation:

$$\omega_i(t) = \prod_{j=1}^{N_i} a_{ij}(t) \quad (2)$$

wherein the linguistic hedge of each input variable forms a fuzzy information system, that is, for each possible value the input variable the sum of the membership values of all membership functions associated with the linguistic statements about the input variable always equals 1;

wherein the linguistic statements in the premise of each rule are always linked in an AND relationship;

wherein the linguistic statements in the premise of each rule apply to pairwise different input variables;

wherein the set of rules is complete, that is, for every possible combination (statement$_1$, ..., statement$_n$) of linguistic statements, where n is the number of input values and statement$_i$ is the $i^{th}$ input value (i=1, ..., n), there exists one rule $R_i$ whose premise is composed exclusively of linguistic statements from the set (statement$_i$, ..., statement$_n$); and ... wherein the set of rules is consistent, that is, for each possible combination (statement$_1$, ..., statement$_m$) of linguistic statements there is at most one rule $R_i$ whose premise is composed exclusively of linguistic statements from the set (statement$_i$, ..., statement$_m$);

so that the divisor $$\sum_{i=1}^{N} \omega_i(t)$$

in Equation (1) always takes on the value of 1.

Preferably, the association functions employed are trapezoidal.

The method according to the present invention also provides that at every sampling timepoint, for every input signal and for all linguistic statements about each input signal, the membership value of the current value of the signal is determined in advance from the membership function associated with the linguistic statement, is intermediately stored and the stored membership values are employed when a rule is evaluated at this sampling timepoint.

The present invention further provides a method for providing an output signal for a fuzzy controller by evaluating a complete and consistent set of linguistic rules, each rule of the set including a premise having at least one linguistic statement about an input signal of the controller and a conclusion having a linguistic statement about an output signal, the method including the steps of forming a linguistic hedge corresponding to each respective input signal to be a fuzzy information system such that a sum of association values for association functions characterizing linguistic statements about the respective input signal equals 1, formulating complete and consistent rules with linguistic statements about pairwise different input variables as the premise and with a linguistic statement about the output variable of the fuzzy controller als the conclusion, wherein the linguistic statements are linked by an AND relationship, defuzzifying each membership function which characterizes the conclusion of each respective rule to produce a first signal representing a first numerical value corresponding to the respective rule, determining a degree of membership of the input signals of each respective rule to produce second signals representing the degree of membership corresponding to the input signals of each respective rule, combining the second signals of each respective rule to produce a third signal corresponding to each respective rule, multiplying the first and third signals of a respective rule to produce a fourth signal representing a weighted recommended action corresponding to the respective rule, adding each fourth signal to produce the output signal.

Preferably, the membership function characterizing the conclusion of each respective rule is trapezoidal.

A further aspect of the present invention provides for determining all membership values for each input signal and for each linguistic statement about that input signal in advance; storing the membership values determined in advance in a memory; and accessing a particular stored membership value when the corresponding linguistic statement about that input signal is required in the calculation.

The method according to the invention ensures that the sum of the weighting factors always equals 1. Thus, the step of summation (Step VI) and division (Step VII) shown in FIG. 1 performed during the runtime of the controller of the present invention are no longer necessary; so less computation time is required and hardware requirements are reduced accordingly. Further, a test (not shown in FIG. 1) to determine whether the denominator is zero is no longer necessary.

In addition to the advantages mentioned above, the method according to the present invention has further advantages which ensure that a fuzzy controller is able to determine an output value for every possible combination of input values, whereas in conventional methods, it is possible that the sum of the weighting factors $\omega_i(t)+\ldots+\omega_N(t)$ equals zero at a specific sampling timepoint, so that the conventional fuzzy controller is unable to perform an action, and which ensure that the characteristic surface of the fuzzy controller of the present invention is a continuous function, if the system is limited to continuous membership functions for linguistic statements about input values, whereas many conventionally operating fuzzy controllers may have an discontinuous characteristic surface even with continuous membership functions.

One embodiment of the invention will now be described in greater detail with reference to the drawing figures.

BRIEF DESCRIPTION OF THE DRAWINGS

The various objects of the present invention, together with the advantages and benefits which may be attained by its use, will become more apparent upon reading the following detailed description of the invention taken in conjunction with the drawings. In the drawings, wherein like reference numerals identify corresponding portions of the fuzzy controller.

DESCRIPTION OF PREFERRED EMBODIMENTS OF THE PRESENT INVENTION

Figure 2:
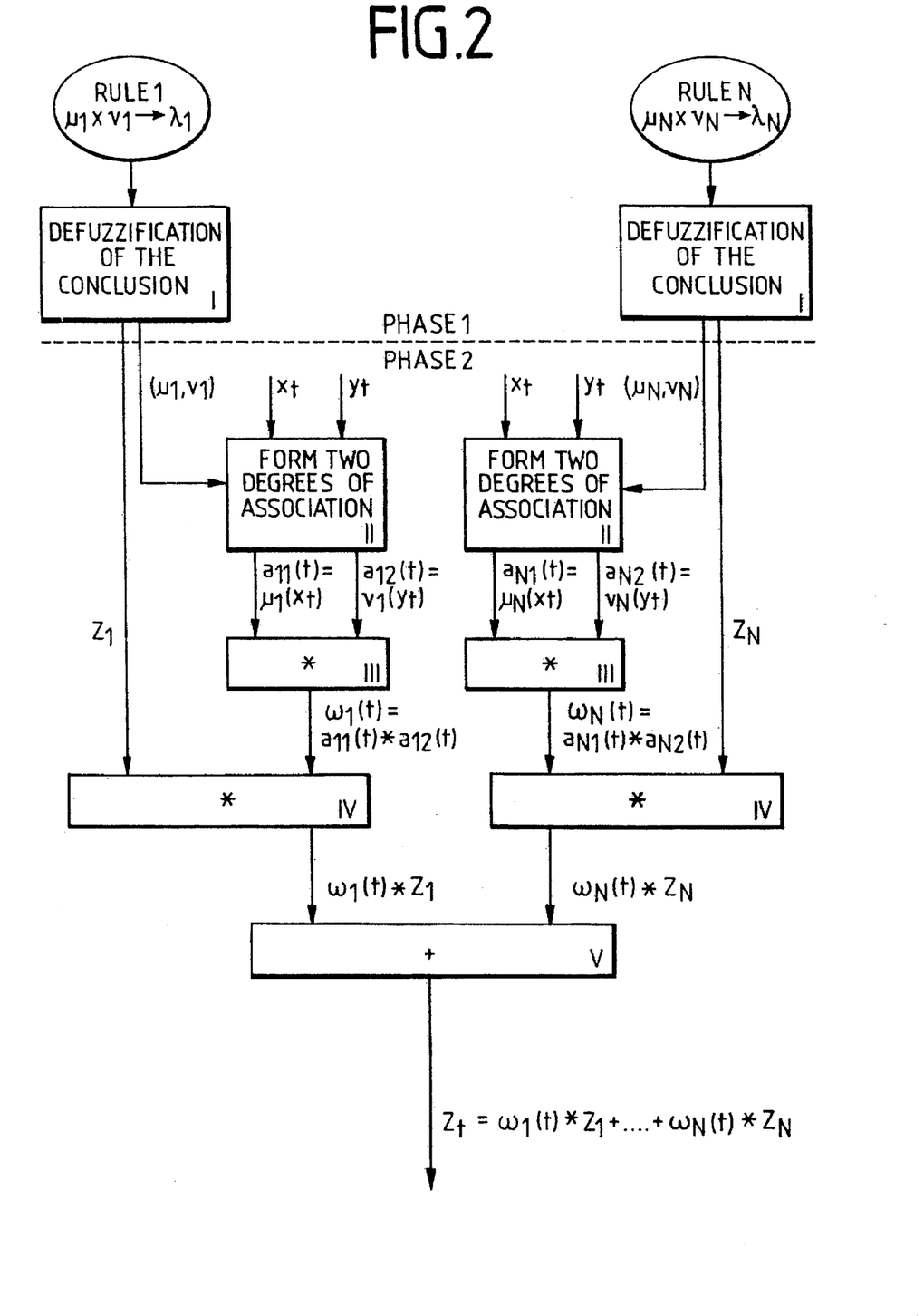
FIG. 2 depicts a fuzzy controller operating mode for evaluating input signals based on a set of linguistic rules to provide an output signal according to the method of the invention.

FIG. 2 illustrates a fuzzy controller which provides an operating technique which efficiently evaluates a set of linguistic rules to produce an output signal related to input signals applied to the controller. Due to the fact that, due to the invention, in the formation of the output signal $z_t$, the divisor always takes on the value of 1, the method steps shown in gray in FIG. 1 are not required.

The conditions specifically required by the present invention and which are described in greater detail below, which cause the divisor in Equation (1) above to always nave the value of 1 when the output signal $z_t$ is formed, habe been realized per se in practice and have been mentioned several times in the available literature. However, the present invention resides in the non-obvious combination of the totality of the following conditions.

Figure 3A:
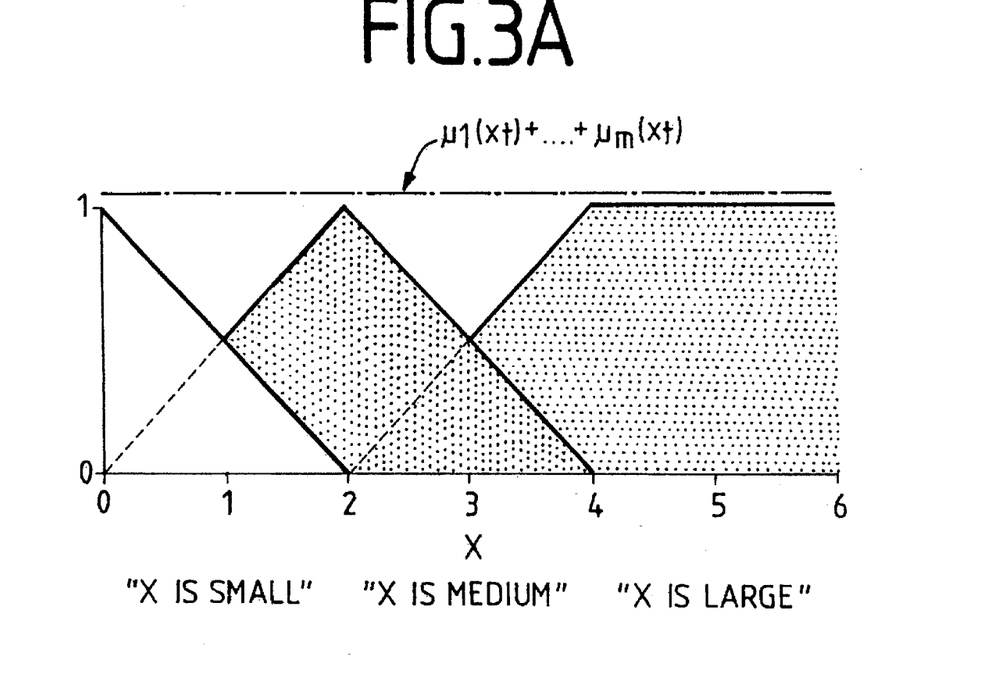
FIGS. 3A and 3B are illustrations for the discussion of the term "fuzzy information system" according to the present invention.
Figure 3B:
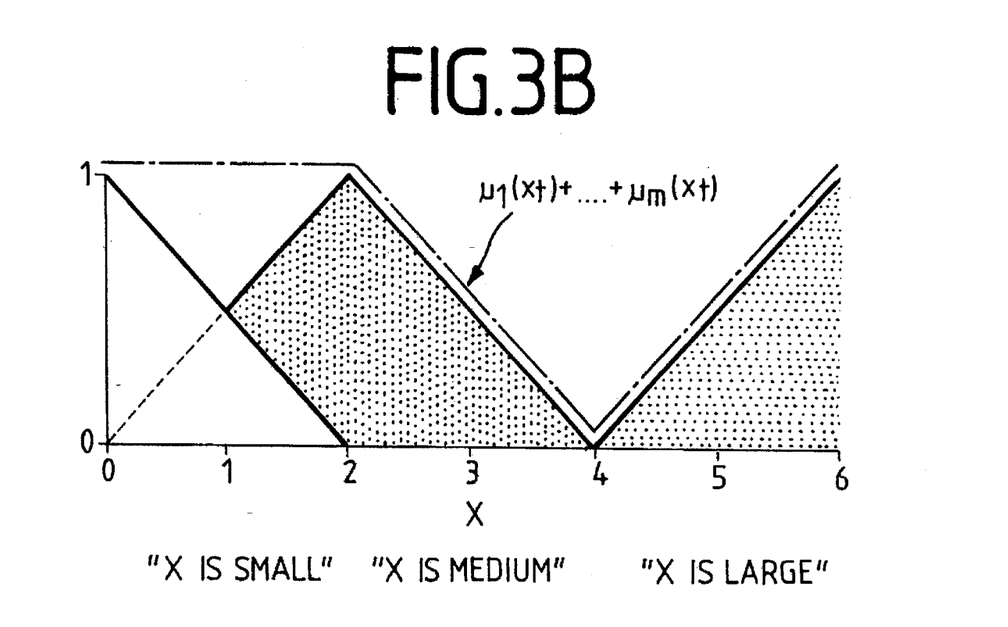
Figure 4A:
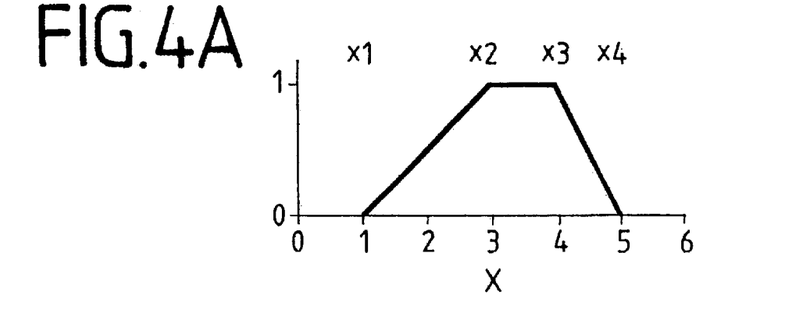
FIGS. 4A–4D depict trapezoidal association functions and fulcrum points according to the present invention.
Figure 4B:
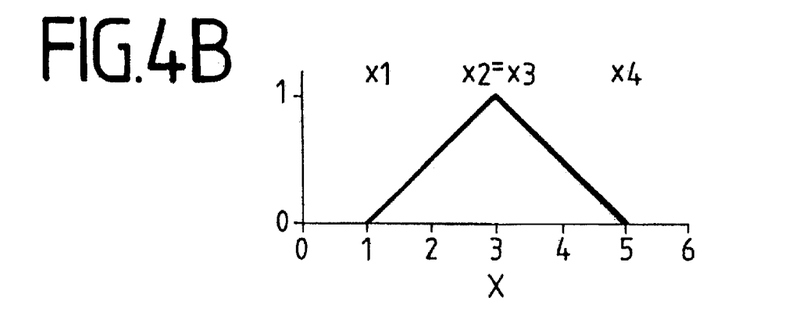
Figure 4C:
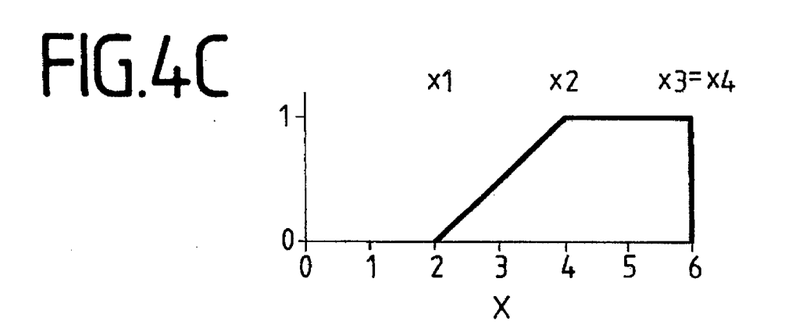
Figure 4D:
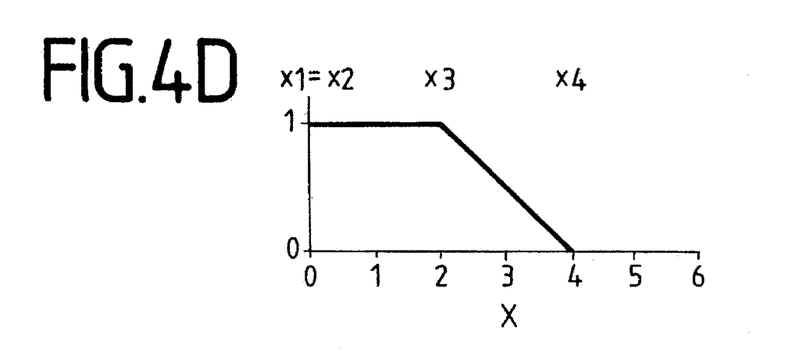

FIGS. 3A and 3B illustrates the term "fuzzy information system" according to the present invention. For each input value and each number x from the input value range, the sum of all the membership values of x for each element of the linguistic hedge of the input value equals 1. The linguistic hedge of a variable is the set membership functions for the linguistic statements about the variable. FIG. 3A shows a fuzzy information system according to the present invention. That is, the sum of the membership values "x is small", "x is medium" and "x is large" equals 1 for all values of x, as shown by the broken line at the top of FIG. 3A. FIG. 3B shows a system which is not a fuzzy information system according to the present invention. The sum of the membership values of x does not always equal 1.

The term "complete set of rules" according to the present invention will be described with the aid the following example. Let it be assumed that X and Y are the two input variables of the fuzzy controller and "X is large" and "Y is small" are two linguistic statements about X and Y, respectively. Then, a set of rules is complete only if it includes a rule with the premise "X is large", or a rule including the premise "Y is small", or a rule including the premise "X is large AND Y is small".

The same example will be used to illustrate the term "consistent set of rules" according to the present invention. The set of rules is consistent only if it either comprises at most one rule with the premise "X is large AND Y is small", or at most one rule with the promise "X is large", or at most one rule with the promise "Y is small", but not a rule with the premise "X is large AND Y is small" as well as a rule with the premise "X is large", or one with a premise "X is large AND Y is small" as well as one with a premise "Y is small", nor a rule with the premise "X is large" as well as a rule with the premise "Y is small". Moreover, the set or rules is consistent only if it does not include two rules with the same premise, e.g., g. "X is large".

Thus, the set of rules in the above example is complete and consistent only if there is either precisely one (and only one) rule with the premise "X is large AND Y is small", or precisely one rule with the premise "X is large", or precisely one rule with the premise "Y is small".

The conditions illustrated as examples for a pair of linguistic statements must of course apply for each pair of linguistic statements about the input variables.

There is a further requirement that the linguistic statements in the premise of each rule are always linked with AND means, for the above example, that there must not be a linguistic rule including the premise "X is large OR Y is small". The condition that the linguistic statements in the premise always refer to pairwise different input rallies, excludes, for example, a rule with the premise "X is small AND X is fairly large".

That the divisor in Equation (1) is always 1 is demonstrated for the case of two input variables X and Y.

Let it be assumed that $(\mu^{(1)}, \ldots, \mu^{(m)})$ constitute the linguistic hedge for X, $(v^{(1)}, \ldots, v^{(n)})$ the linguistic hedge for Y and $(\lambda^{(1)}, \ldots, \lambda^{(l)})$ the linguistic hedge for Z. For i=1, ..., N, $\mu_i$, $v_i$ and $\lambda_i$ are assumed to be the membership functions for the linguistic statements about X, Y and Z in rule $R_i$; and $\mu_i$, $v_i$, $\lambda_i$ are elements of $(\mu^{(1)}, \ldots, \mu^{(m)})$, $(v^{(1)}, \ldots, v^{(n)})$ are elements of $(\lambda^{(1)}, \ldots, \lambda^{(l)})$, respectively.

On the basis of Equation (2) above, the following then applies for the sum of the weighting factors:

$$\sum_{i=1}^{N} \omega_i(t) = \sum_{i=1}^{N} a_{i1}(t) * a_{i2}(t) = \sum_{i=1}^{N} \mu_i(x_t) * v_i(y_t) \quad (3)$$

If one considers that $(R_1, \ldots, R_N)$ is a complete and consistent set of rules, that is, every possible combination of $\mu^{(j)}$ and $v^{(k)}$ occurs—either directly or indirectly—precisely once in the last term of Equation (3), then the different summands can here be rearranged and written as a double sum. If one further considers that the linguistic hedges for X and Y each form a fuzzy information system as defined earlier, the following results:

$$\sum_{i=1}^{N} \omega_i(t) = \quad (4)$$

$$\sum_{j=1}^{m} \sum_{k=1}^{n} \mu^{(j)}(x_t) * v^{(k)}(y_t) = \sum_{j=1}^{m} \mu^{(j)}(x_t) * \sum_{k=1}^{n} v^{(k)}(y_t) = 1$$

A fuzzy controller operating according to the method of the invention as shown in FIG. 2 can be realized as a hardwired controller with analog and/or digital computing function blocks or as a software proram on commercially available computer hardware components or on a dedicated controller. For example, a dedicated fuzzy controller may be configured to control traffic signals at an intersection based on detected traffic patterns, or to control signal switching in a communication system based on detected signal parameters. Such a dedicated controller may be embodied as a commonly available read only memory (ROM) to emulate operations indicated as Step I in FIG. 2 by storing the results of the operations off-line and reading the results on-line. Tasks connected with Step II can be embodied as dedicated hardwired digital or analog function blocks or conveniently as a programmed microprocessor which is responsive to input signals for determining degrees of membership of the input signals to the membership functions. Tasks associated with Steps III–V in FIG. 2 can also be performed by the microprocessor performing Step II tacks. However, logic and registers arranged using well-known configurations can be operated as sequential logic or a state machine to free the microprocessor to perform the associative tasks of Step II.

FIGS. 4A–4D show trapezoidal membership functions permissible according to the invention (this also includes triangular functions and ramp functions). Each trapezoidal membership function is clearly identified by four fulcrum points at $x_1, \ldots, x_4$, if the following is defined:

$$\mu(x_1) = \mu(x_4) = 0 \text{ and } \mu(x_2) = \mu(x_3) = 1$$

If the system is limited to trapezoidal association functions, each association value can be determined accurately in that first the fulcrum points adjacent to the current value are determined and then a linear interpolation takes place between these two fulcrum points (see FIG. 4). With this limitation the defuzzification of the membership functions required in the first phase for the conclusions of the rules is easily performed, also.

The characteristic surface of the fuzzy controller in the case of trapezoidal membership functions is a multidimensional multi-linear surface. If one selects suitable fulcrum points, a fuzzy controller operating according to the invention can be acurately simulated by multi-dimensional linear interpolation over the fulcrum points. "Accurately" here means that a conventional fuzzy controller and the interpolating simulation have exactly the same characteristic surface.

If the system is limited to trapezoidal membership functions, a fuzzy controller operating according to the invention as illustrated in FIG. 2 can also be realized by three-dimensional linear interpolation over suitably selected fulcrum points.

Figure 5:
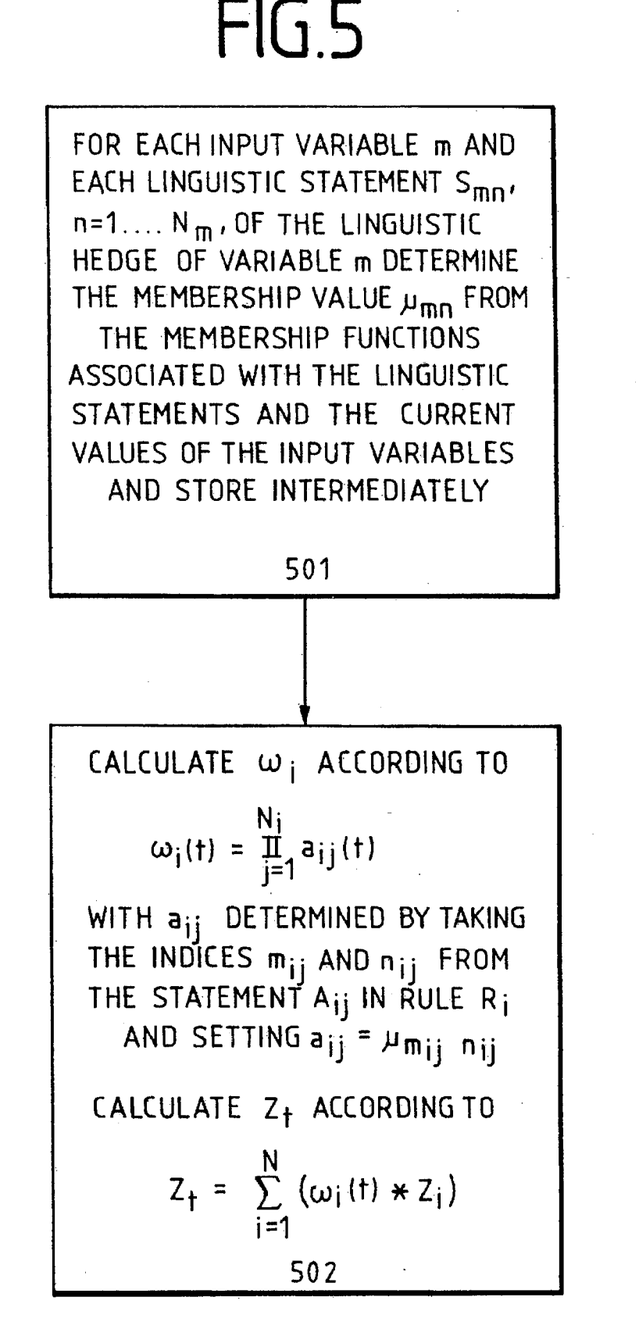
FIG. 5 depicts an operating mode of a fuzzy controller according to the present invention.

As another advantageous feature, shown in FIG. 5, the fuzzy controller of the present invention performs its work in two steps at every sampling moment:

In step 501, the membership values of the current value of each input variable for all linguistic statements are determined from the membership functions of the input variable and are intermediately stored;

In the step 502, the value $\omega_i(t)$ is calculated according to Equation (2) by accessing these intermediately stored values. If in an embodiment, there are two input values X and Y, then $n_x + n_y$ membership values must be determined, where $n_x$ and $n_y$ are the number of elements of the linguistic hedge of X and Y, respectively. If, in the calculation of the value $\omega_i(t)$ according to Equation (2), the membership values $a_{i1}(t)$ and $a_{i2}(t)$ were determined anew each time for i=1, ..., N, the most unfavorable case would require $n_x * n_y$ determinations of a membership value to be made.

It will be understood that the above description of the present invention is susceptible to various modifications, changes and adaptations, and the same are intended to be comprehended within the meaning and range of equivalents of the appended claims.

What is claimed is:

1. A device for creating an output signal for controlling an external object in accordance with input signals using a plurality of fuzzy rules wherein each of the fuzzy rules of said plurality of fuzzy rules includes a premise with one or more linguistic statements about the input signals and a conclusion with one linguistic statement about the output signal, said device comprising:

a) at least one storage unit for storing a plurality of fuzzy rules;

b) a plurality of generating units for generating amplitude signals by defuzzifying said linguistic statements about said output signals;

c) a plurality of first processing units for receiving said input signals and generating membership signals by fuzzification;

d) a plurality of second processing units for receiving said membership signals and generating intermediate signals;

e) a plurality of multiplier units for receiving said intermediate signals and said amplitude signals and generating product signals;

f) an adder unit for receiving the said product signals and generating the output signal by adding said product signals; and g) an actuator for controlling said external object in accordance with said output signal;

wherein a linguistic hedge of each input signal forms a fuzzy information system, such that, for each possible input signal the sum of membership signals for all membership functions associated with the linguistic statements about the input signal always equals 1;

wherein, the linguistic statements in a premise of each fuzzy rule are always linked in an AND relationship;

wherein, the linguistic statements in the premise of each fuzzy rule refer to pairwise different input signals;

wherein, the plurality of rules is complete, such that, for each possible combination (statement$_1$, . . . , statement$_n$)n of linguistic statements, where n is the number of input signals, such that for each i out of the set $\{1, \ldots, n\}$ statement$_i$ refers to the i$^{th}$ input signal, there exists one rule R$_k$ among said fuzzy rules whose premise is composed exclusively of linguistic statements from the set (statement$_1$, . . . , statement$_n$); and wherein, the plurality of rules is consistent, such that, for each possible combination (statement$_1$, . . . , statement$_n$) of linguistic statements, there is at most one rule R$_k$ among said fuzzy rules whose premise is composed exclusively of linguistic statements from the set (statement$_1$, . . . , statement$_n$).

2. A device according to claim 1, wherein said membership functions associated with the linguistic statements about the input signals have trapezoidal shapes.

3. A device according to claim 2, wherein at least one of the first and second processing units is of a digital kind which processes data numerically.

4. A device according to claim 2, wherein at least one of the first and second processing units is of an analog kind which processes data with linearly or non-linearly continuous transfer laws.

5. A device according to claim 1, wherein at least one of the first and second processing units is of a digital kind which processes data numerically.

6. A device according to claim 5, wherein at least one of the first and second processing units is of an analog kind which processes data with linearly or non-linearly continuous transfer laws.

7. A device according to claim 1, wherein at least one of the first and second processing units is of an analog kind which processes data with linearly or non-linearly continuous transfer laws.

8. A device according to claim 1, including two subdevices where the first subdevice comprises:

a) at least one storage unit for storing a plurality of fuzzy rules;

b) a plurality of generating units for generating amplitude signals by defuzzifying said linguistic statements about said output signals; and c) a unit for replacing a conclusion of said fuzzy rules by said amplitude signals in said at least one storage unit for storing the plurality of fuzzy rules; and wherein the second subdevice comprises:

a) at least one storage unit for storing premises of said fuzzy rules and said amplitude signals;

b) a plurality of third processing units for receiving said membership signals and generating intermediate signals;

c) a plurality of multiplier units for receiving said intermediate signals and said amplitude signals and generating product signals;

d) an adder unit for receiving said product signals and generating the output signal by adding said product signals; and e) an actuator for controlling said external object in accordance with said output signal.

9. A device according to claim 8, wherein said first subdevice operates in a first phase and said second subdevice operates in a second phase whenever the output signal is to be created.

10. A device according to claim 1, including two subdevices where the first subdevice comprises:

a) at least one storage unit for storing a plurality of fuzzy rules;

b) a plurality of generating units for generating amplitude signals by defuzzifying said linguistic statements about said output signals; and c) a unit for replacing a conclusion of said fuzzy rules by said amplitude signals in said at least one storage unit for storing the plurality of fuzzy rules; and wherein the second subdevice comprises:

a) at least one storage unit for storing premises of said fuzzy rules and said amplitude signals;

b) a plurality of third processing units for receiving said membership signals and generating intermediate signals;

c) a plurality of multiplier units for receiving said intermediate signals and said amplitude signals and generating product signals;

d) an adder unit for receiving said product signals and generating the output signal by adding said product signals; and e) an actuator for controlling said external object in accordance with said output signal.

11. A device according to claim 1, including two subdevices where the first subdevice comprises:

a) at least one storage unit for storing a plurality of fuzzy rules;

b) a plurality of generating units for generating amplitude signals by defuzzifying said linguistic statements about said output signals; and c) a unit for replacing a conclusion of said fuzzy rules by said amplitude signals in said at least one storage unit for storing the plurality of fuzzy rules; and wherein the second subdevice comprises:

a) at least one storage unit for storing premises of said fuzzy rules and said amplitude signals;

b) a plurality of third processing units for receiving said membership signals and generating intermediate signals;

c) a plurality of multiplier units for receiving said intermediate signals and said amplitude signals and generating product signals;

d) an adder unit for receiving said product signals and generating the output signal by adding said product signals; and e) an actuator for controlling said external object in accordance with said output signal.

12. A device according to claim 1, including two subdevices where the first subdevice comprises:

a) at least one storage unit for storing a plurality of fuzzy rules;

b) a plurality of generating units for generating amplitude signals by defuzzifying said linguistic statements about said output signals; and c) a unit for replacing a conclusion of said fuzzy rules by said amplitude signals in said at least one storage unit for storing the plurality of fuzzy rules; and wherein the second subdevice comprises:

a) at least one storage unit for storing premises of said fuzzy rules and said amplitude signals;

b) a plurality of third processing units for receiving said membership signals and generating intermediate signals;

c) a plurality of multiplier units for receiving said intermediate signals and said amplitude signals and generating product signals;

d) an adder unit for receiving said product signals and generating the output signal by adding said product signals; and e) an actuator for controlling said external object in accordance with said output signal.

* * * * *